(12) United States Patent
Hawco et al.

(10) Patent No.: US 11,630,853 B2
(45) Date of Patent: Apr. 18, 2023

(54) METADATA CLASSIFICATION

(71) Applicant: Snowflake Inc., Bozeman, MT (US)

(72) Inventors: Craig E. Hawco, Toronto (CA); Joseph David Jensen, Riverhead, NY (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 17/163,156

(22) Filed: Jan. 29, 2021

(65) Prior Publication Data
US 2022/0245175 A1    Aug. 4, 2022

(51) Int. Cl.
*G06F 16/28* (2019.01)
(52) U.S. Cl.
CPC .................. *G06F 16/285* (2019.01)
(58) Field of Classification Search
None
See application file for complete search history.

(56) References Cited

U.S. PATENT DOCUMENTS

| | | | | |
|---|---|---|---|---|
| 2010/0030801 A1* | 2/2010 | Takayama | ............. | G06F 16/284 707/802 |
| 2011/0040552 A1* | 2/2011 | Van Guilder | ........... | G06F 40/40 704/4 |
| 2013/0091138 A1* | 4/2013 | Liensberger | .......... | G06F 40/197 707/740 |
| 2014/0156567 A1* | 6/2014 | Scholtes | ................. | G06F 16/00 706/12 |
| 2015/0278241 A1* | 10/2015 | Bates-Haus | ........... | G06F 16/215 707/692 |
| 2018/0075104 A1* | 3/2018 | Oberbreckling | ...... | G06F 16/221 |
| 2019/0130029 A1* | 5/2019 | Cai | ........................ | G06F 16/213 |
| 2019/0243898 A1* | 8/2019 | Walker | .................... | G06F 16/35 |
| 2020/0242642 A1* | 7/2020 | Thimsen | ................. | G06F 16/36 |
| 2020/0272651 A1* | 8/2020 | Luo | ......................... | G06F 16/38 |
| 2020/0311077 A1* | 10/2020 | Zhang | ............... | G06F 16/24542 |
| 2020/0372073 A1* | 11/2020 | Dahl | ...................... | G06F 16/188 |
| 2021/0096974 A1* | 4/2021 | Ranchal | ............... | G06K 9/6256 |
| 2022/0019741 A1* | 1/2022 | Roy | ......................... | G06N 5/04 |
| 2022/0180214 A1* | 6/2022 | Cervantes | ................ | G06N 3/08 |

FOREIGN PATENT DOCUMENTS

| | | | | |
|---|---|---|---|---|
| EP | 1090365 B1 * | 7/2013 | ........... | G06F 16/353 |
| JP | 2004326465 A * | 11/2004 | | |
| WO | WO-2020149897 A1 * | 7/2020 | ............... | G06F 8/36 |

* cited by examiner

*Primary Examiner* — Augustine K. Obisesan
(74) *Attorney, Agent, or Firm* — Womble Bond Dickinson (US) LLP

(57) ABSTRACT

Generating semantic names for a data set is described. An example method can include retrieving data from a data set, the data organized in a plurality of columns. The method may also include generating one or more candidate semantic categories for that column, wherein each of the one or more candidate semantic categories has a corresponding probability for each of the columns. The method may also further include creating a feature vector for each column from the one or more column candidate semantic categories and the corresponding probabilities. Additionally, the method may also include selecting, for each column, a column semantic category from the one or more candidate semantic categories using at least the feature vector and a trained machine learning model.

15 Claims, 10 Drawing Sheets

METADATA CLASSIFICATION

TECHNICAL FIELD

The present disclosure relates to data processing and, in particular, to classifying metadata for columnar data.

BACKGROUND

Customers want to understand their data and would like to have the ability to automatically classify columns. Classification not only gives customers an understanding of their data but also enables them to use a variety of data governance and data privacy tools. This will become more important as more privacy regulations become law around the world. As part of those regulations it is imperative for customers to understand what personal data they have, where it is, how long they have had it, and how to protect it while still deriving insights. Classification is an important first step. In addition, classification can be used in governance, access control and policy management, personally identifiable information, and anonymization.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

In the described systems and methods, a data storage system utilizes an SQL (Structured Query Language)-based relational database. However, these systems and methods are applicable to any type of database using any data storage architecture and using any language to store and retrieve data within the database. The systems and methods described herein further provide a multi-tenant system that supports isolation of computing resources and data between different customers/clients and between different users within the same customer/client.

In one embodiment, a cloud computing platform can automatically classify columnar data that is part of a data set. Classification can allow customers an understanding of their data but also enables them to use a variety of data governance and data privacy tools, which can become more important as more privacy regulations become law around the world. As part of those regulations it is imperative for customers to understand what personal data they have, where it is, how long they have had it, and how to protect it while still deriving insights. Classification is an important first step. In addition, classification can be used in governance, access control and policy management, personally identifiable information, and anonymization.

In this embodiment, the cloud computing platform retrieves data from a data set, where the data is columnar data or can be extracted or transformed into columnar data. The cloud computing platform further determines one or more semantic categories for each of the columns associated with the data. The semantic categories can be generated by examining the data using a variety of schemes to determine the one or more semantic categories. For example, and in one embodiment, the cloud computing platform can apply whitelist and/or blacklist bloom filters, use a lookup table, and/or apply a range or a range and pattern. Different bloom filters or other schemes can be applied to the same column to generate multiple different candidate semantic categories for a single column.

In addition, the cloud computing platform can determine a probability for each of the candidate semantic categories. In one embodiment, the probability represents a possibility that the column data fits the associated semantic category. The cloud computing platform further determines a column semantic category using the probabilities of the candidate semantic categories and a threshold. With the column semantic category determined for each column in the data set, the cloud computing platform assigns a privacy category to the data set columns. Furthermore, the cloud computing platform can anonymize the data using the privacy categorizations of the data set.

Figure 1:
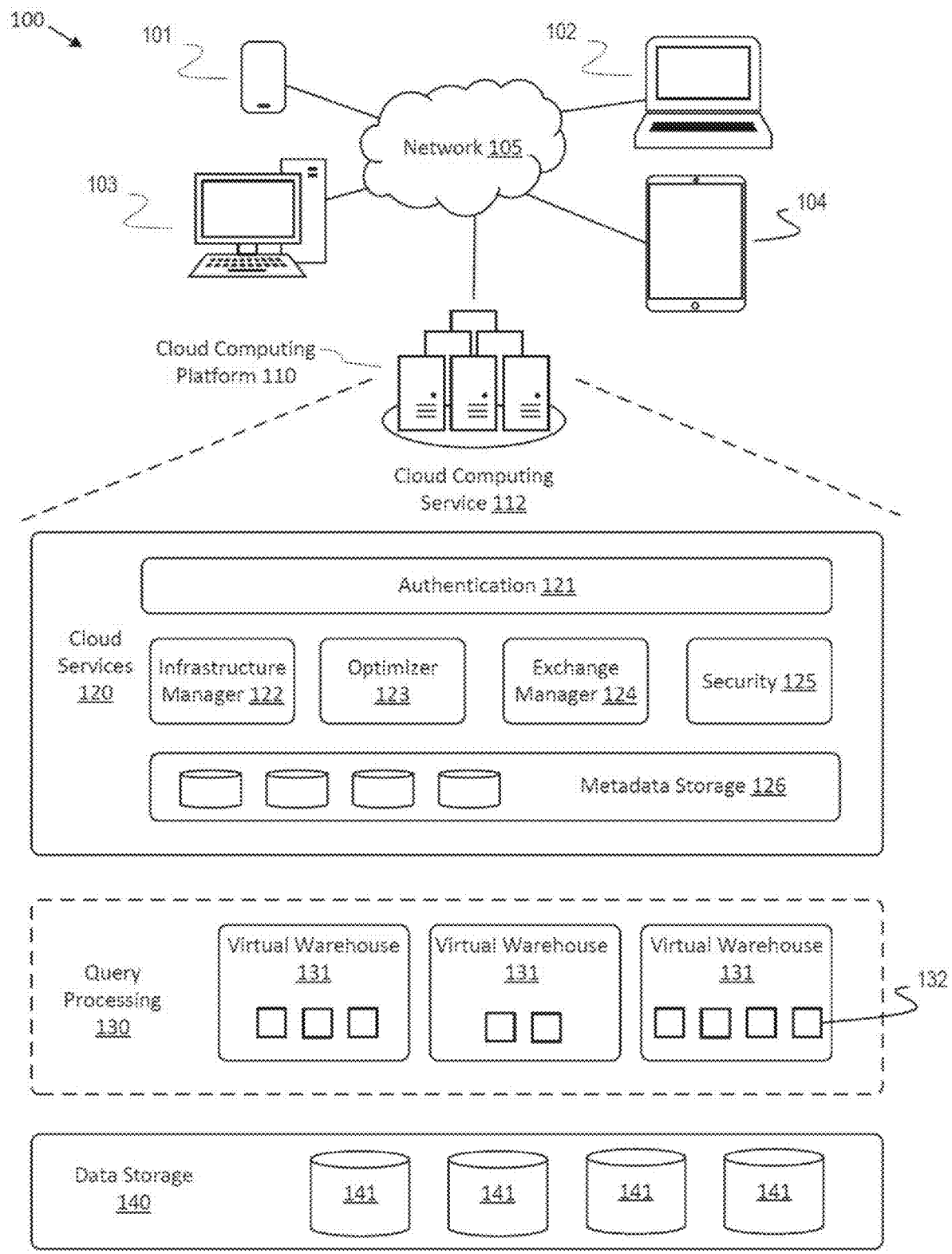
FIG. 1 is a block diagram depicting an example computing environment in which the methods disclosed herein may be implemented.

FIG. 1 is a block diagram of an example computing environment 100 in which the systems and methods disclosed herein may be implemented. In particular, a cloud computing platform 110 may be implemented, such as AMAZON WEB SERVICES™ (AWS), MICROSOFT AZURE™, GOOGLE CLOUD™ or GOOGLE CLOUD PLATFORM™, or the like. As known in the art, a cloud computing platform 110 provides computing resources and storage resources that may be acquired (purchased) or leased and configured to execute applications and store data.

The cloud computing platform 110 may host a cloud computing service 112 that facilitates storage of data on the cloud computing platform 110 (e.g. data management and access) and analysis functions (e.g., SQL queries, analysis), as well as other computation capabilities (e.g., secure data sharing between users of the cloud computing platform 110). The cloud computing platform 110 may include a three-tier architecture: data storage 140, query processing 130, and cloud services 120.

Data storage 140 may facilitate the storing of data on the cloud computing platform 110 in one or more cloud databases 141. Data storage 140 may use a storage service such as AMAZON S3 to store data and query results on the cloud computing platform 110. In particular embodiments, to load data into the cloud computing platform 110, data tables may be horizontally partitioned into large, immutable files which may be analogous to blocks or pages in a traditional database system. Within each file, the values of each attribute or column are grouped together and compressed using a scheme sometimes referred to as hybrid columnar. Each table has a header which, among other metadata, contains the offsets of each column within the file.

In addition to storing table data, data storage 140 facilitates the storage of temp data generated by query operations (e.g., joins), as well as the data contained in large query results. This may allow the system to compute large queries without out-of-memory or out-of-disk errors. Storing query results this way may simplify query processing as it removes the need for server-side cursors found in traditional database systems.

Query processing 130 may handle query execution within elastic clusters of virtual machines, referred to herein as virtual warehouses or data warehouses. Thus, query processing 130 may include one or more virtual warehouses 131, which may also be referred to herein as data warehouses. The virtual warehouses 131 may be one or more virtual machines operating on the cloud computing platform 110. The virtual warehouses 131 may be compute resources that may be created, destroyed, or resized at any point, on demand. This functionality may create an "elastic" virtual warehouse that expands, contracts, or shuts down according to the user's needs. Expanding a virtual warehouse involves generating one or more compute nodes 132 to a virtual warehouse 131. Contracting a virtual warehouse involves removing one or more compute nodes 132 from a virtual warehouse 131. More compute nodes 132 may lead to faster compute times. For example, a data load which takes fifteen hours on a system with four nodes might take only two hours with thirty-two nodes.

Cloud services 120 may be a collection of services that coordinate activities across the cloud computing service 110. These services tie together all of the different components of the cloud computing service 110 in order to process user requests, from login to query dispatch. Cloud services 120 may operate on compute instances provisioned by the cloud computing service 110 from the cloud computing platform 110. Cloud services 120 may include a collection of services that manage virtual warehouses, queries, transactions, data exchanges, and the metadata associated with such services, such as database schemas, access control information, encryption keys, and usage statistics. Cloud services 120 may include, but not be limited to, authentication engine 121, infrastructure manager 122, optimizer 123, exchange manager 124, security 125 engine, and metadata storage 126.

In one embodiment, the cloud computing service 112 can classify a data set based on the contents of the data in the data set. In this embodiment, the cloud computing service 112 retrieves data from a data set, where the data is organized in a plurality of columns. The cloud computing service 112 can further generate one or more candidate semantic categories for each column, where each of the one or more candidate semantic categories has a corresponding probability. The cloud computing service 112 can further create a feature vector for each column from the one or more column candidate semantic categories and the corresponding probabilities. Additionally, the cloud computing service 112 can also select, for each column, a column semantic category from the one or more candidate semantic categories using at least the feature vector and a trained machine learning model.

Figure 2:
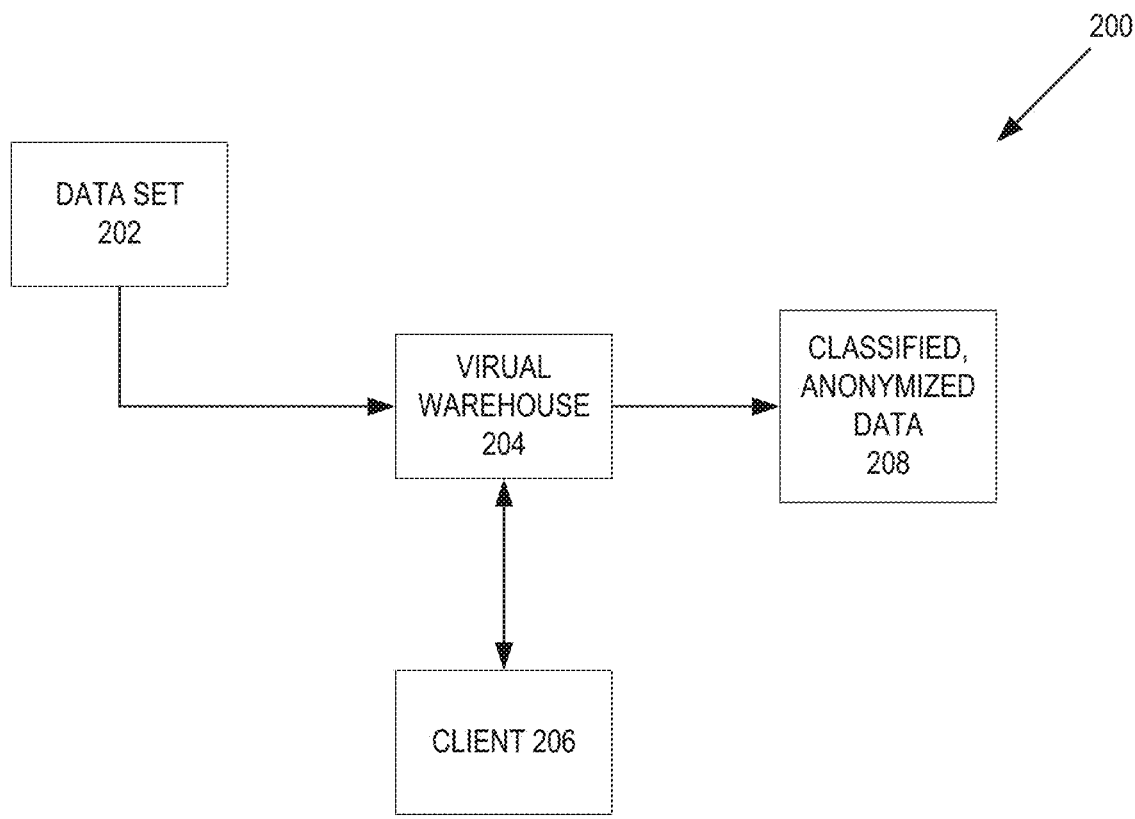
FIG. 2 is a schematic block diagram of one embodiment of a classification and anonymization operation.

FIG. 2 is a schematic block diagram of one embodiment of a system 200 that performs a classification and anonymization operation on a data set. In FIG. 2, system 200 includes a cloud computing platform 204 that retrieves a data set 202 and classifies and/or anonymizes that data set 202 to give a classified and/or anonymized data set 206. In one embodiment, the data set can be any type of data set stored in columns or can be converted into columnar data (e.g., JavaScript Object Notation, key-value data, and/or other types of stored data). In a further embodiment, the cloud computing platform 204 is a computing platform that offers a variety of data processing and/or storage services, such as cloud computing platform 110 described in FIG. 1 above. In another embodiment, the client 206 is a personal computer, laptop, server, tablet, smart phone, and/or another type of device that can process data. In this embodiment, the client 206 can request the classification and/or anonymization of the data set 202. In addition, the client 206 can present intermediate results and allow a user to alter the results. For example, and in one embodiment, the client can present semantic categories and/or semantic category types for each of the columns of the data set. A user may modify the semantic categories and/or the semantic category types for one or more of the columns and the cloud computing platform 204 can re-classify and/or anonymize the data set. In one embodiment, the classified and/or anonymized data 208 is columnar data, organized using the columns determined by the cloud computing platform 204.

Figure 3:
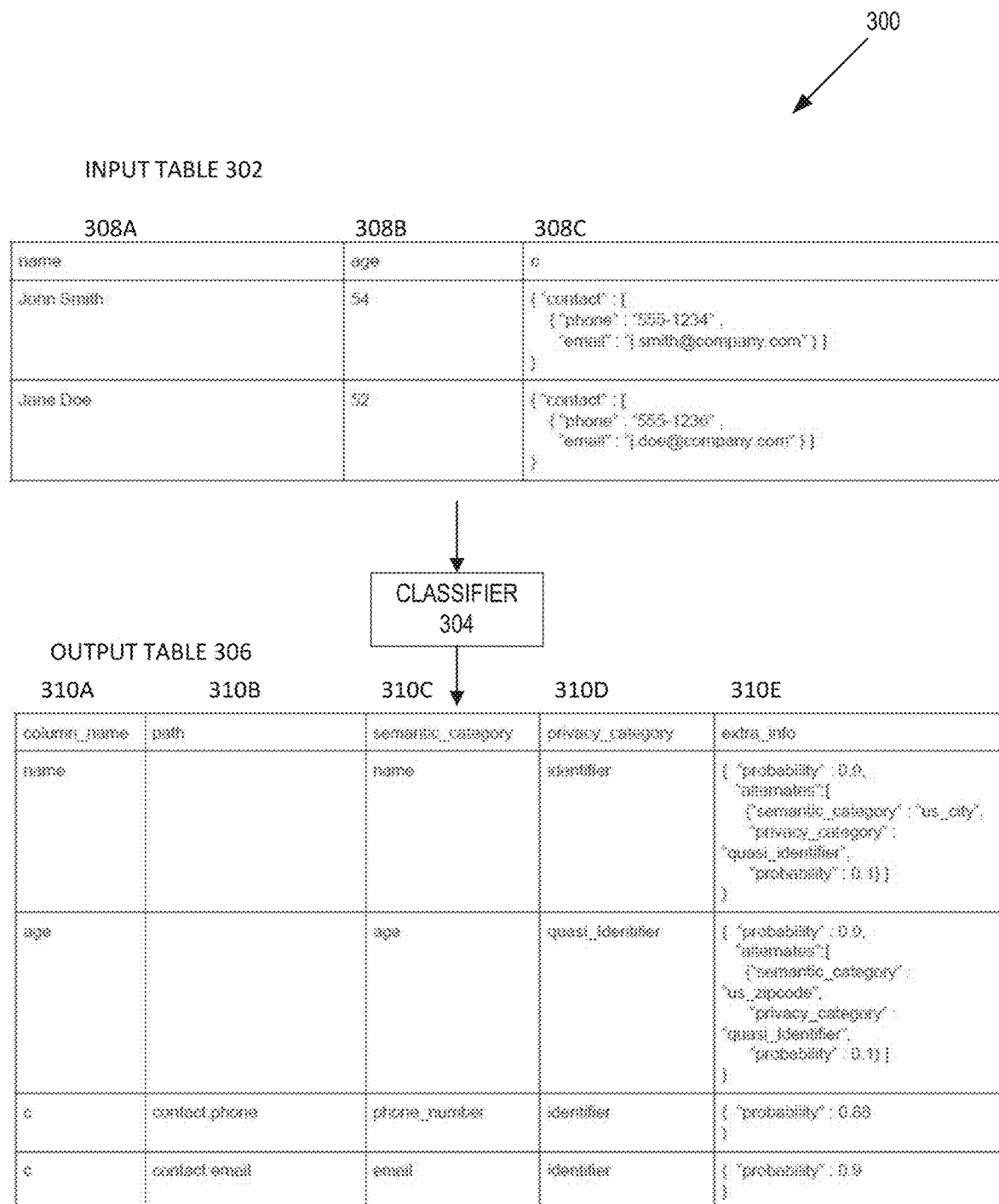
FIG. 3 is a schematic block diagram of one embodiment of a classification operation of an input table to produce an output table.

FIG. 3 is a schematic block diagram of one embodiment of a classification operation 300 of an input table 302 to produce an output table 306. In FIG. 3, the input table 302 includes columns 302A-C of name 308A, age 308B, and "c" 308C. In one embodiment, the column "c" 308A includes attribute-value contact data ("contact", "home", and "email") that can be expanded into additional columns. In a further embodiment, the classifier 304 classifies the input data based on the content of the data in the columns 308A-C. In this embodiment, for each column, that classifier 304 analyzes the column data and determines one or more candidate semantic categories for the column data. A semantic category is an identifier for the column that describes the data. The classifier 304 can generate multiple semantic categories for a single column as the column data may fit with different semantic categories. For example, and in one embodiment, a column with data describing names may also fit a description of street names.

In one embodiment, the classifier 304 classifies the data in columns 308A-C from the input table 302 into the output table 306 with columns 310A-E. The classifier, in this embodiment, converts a three data column in the input data into four data columns: "name," "age,", "contact:phone" and "contact:email." The classification output organizes the data into a different structure of columns so as to organize the classified data. In this embodiment, column 310A is the column_name for the output table 306, where the column_name is the original column name in the input table 302. Column 310B is a path for the classified data (e.g., blank for separate column data such as column 308A-B and a path-name for the data embedded in column 308C). Column 310C gives an initial semantic category to the classified data. For example, and in one embodiment, the data with the column name "name" has a semantic category "name", the data with the column name "age" has a semantic category "age," the data with the column name "c" and path "contact:phone" has a semantic category "phone_number," and the data with the column name "c" and path "contact:email" has a semantic category "email." In one embodiment, the semantic category for the column data is equivalent to a semantic category.

With the semantic category assigned, a privacy category can be assigned. In one embodiment, the classifier 304 determines a privacy category for the data based on the semantic category designation. In this embodiment, there are at least four different kinds of privacy categories: identifier, quasi-identifier, sensitive, and other. In another embodiment, there can be other types of the privacy categories. In one embodiment, the privacy categories indicate how the data is to be treated during the anonymizing operation. For example, and in one embodiment, data having a privacy category of identifier or sensitive is suppressed during the anonymizing operation. Identifier data is data that can identify a person or thing, such as a name, email or phone number. Thus, if identifier data survives the anonymizing operation, the anonymity will be lost. Sensitive data, such as medical results, is a type of data that is not to be revealed for moral or legal reasons. Quasi-identifiers are attributes that may not identify a person or thing by themselves, but can be uniquely identifying an individual in combination. For example, an age, gender, and zip may be able to identify an individual alone or in combination with other publicly available data. Data with a privacy category of other is not transformed.

As noted above, the classified data can have more than one possible semantic category. In one embodiment, the classifier 304 classifies the "name" as having a semantic category of "name" and also as a semantic category as "us_city." Which semantic category that classifier choses to assign is based on a probability compute by the classifier. In one embodiment, the probability is a possibility that the computed semantic category is correct for the data in that column. In this embodiment, each semantic category computed for a column of data will have a computed probability. The classifier selects which semantic category based on the probability and a threshold. In one embodiment, the classifier selects the semantic category with the highest probability that is above the threshold. It is possible that the classifier does not select any semantic category for a particular column. In one embodiment, the threshold is assigned by a user or is a default value. In another embodiment, the classifier calculates the threshold using a machine learning mechanism.

In FIG. 3, the classifier 304 computes two different semantic categories for the "name" column: "name" with a probability of 0.9 and "us_city" with a probability of 0.1. In one embodiment, the classifier would assign the "name" column with a semantic category of "name" based on the relative priorities. In a further embodiment, a user could review the classifications and manual change the classifications as desired. Classifying the data is further described in FIG. 5 below.

Figure 4:
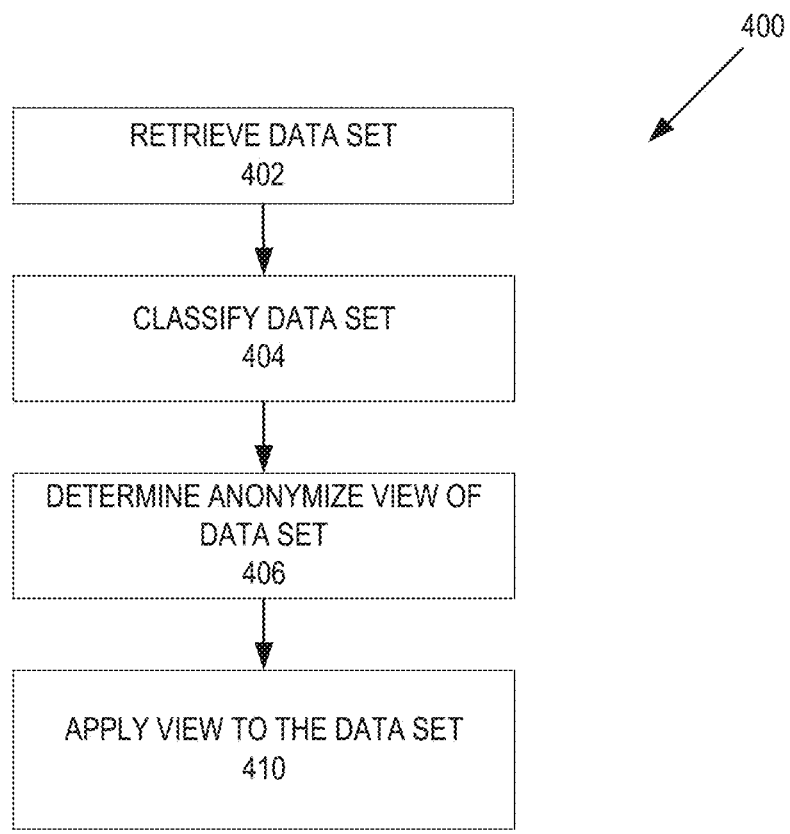
FIG. 4 is a flow diagram of one embodiment of a method to perform a classification and anonymization operation of a data set.

FIG. 4 is a flow diagram of one embodiment of a method 400 to perform a classification and anonymization operation of a data set. In general, the method 400 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. For example, the processing logic may be implemented as the query processing 130. Method 400 may begin at step 402, where the processing logic retrieves the data set. In one embodiment, the data set is columnar data or can be extracted or transformed into columnar data. At step 404, processing logic may classify the data set. In one embodiment, processing logic classifies the data set by determining the semantic characteristic of the data in the data set. In one embodiment, processing logic determines the semantic characteristics by classifying the data in the data set and determining one or more candidate semantic categories (or equivalently, semantic categories) for each of the columns in the dataset. In a further embodiment, processing logic determines the semantic categories by applying a bloom filter, whitelist, and/or blacklist and further determining a probability for each of the semantic categories. Classification of the data set is further described in FIG. 5 below.

At step 406, processing logic determines an anonymized view of the data set. In one embodiment, processing logic determines the anonymized view by using the semantic categories and associated privacy categories to anonymize the data. In this embodiment, processing logic uses privacy categories to determine whether to suppress the individual data, anonymize the individual data, or ignore. Anonymizing the data set is further described in FIG. 6 below. Processing logic generates the view at step 408.

Figure 5:
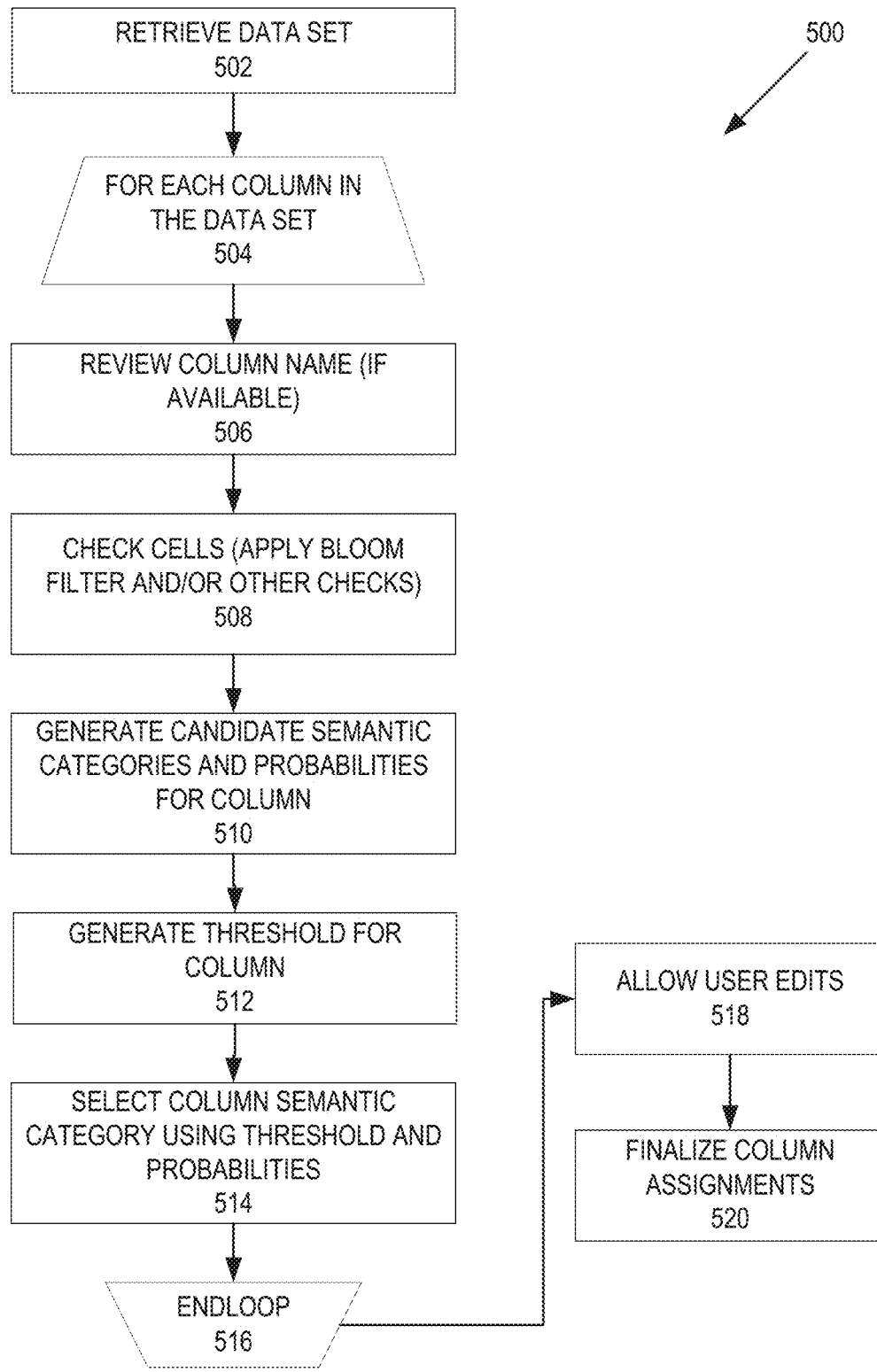
FIG. 5 is a flow diagram of one embodiment of a method to perform a classification operation of a data set.

FIG. 5 is a flow diagram of one embodiment of a method 500 to perform a classification operation of a data set. In general, the method 500 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. For example, the processing logic may be implemented as the query processing 130. Method 500 may begin at step 502, where the processing logic retrieves the data set. In one embodiment, the data set is columnar data or data that can be extracted into column data. For example, and in one embodiment, the data can be a mixture of columns and embedded columns as illustrated in the input table 302 in FIG. 3 above.

Processing logic performs a processing loop (steps 504-516) to determine a column semantic category. At step 506, processing logic reviews the column name (if available). In one embodiment, processing logic looks for fragments in the column name to determine whether this column name is a match to one of the possible semantic categories. In this embodiment, processing logic uses a match to either boost the probability that this semantic category is a match or lower a threshold that this semantic category is a match. For example, and in one embodiment, a column name that is "Local Zip Code" matches the semantic category "zip code." In this example, processing logic can boost a probability by a certain percentage (e.g., 10% or another percentage) or drop a threshold for a match by a certain percentage (e.g., 10% or another percentage). Alternatively, a column name that is "Postal C" may not be a match to one of the semantic categories. In this example, processing logic would not adjust the resulting probability or threshold from this column name. Processing loop checks the cells of the columns to determine the candidate semantic categories and probabilities at step 508. In one embodiment, processing logic applies a variety of different checks for the possible semantic categories to determine the candidate semantic categories and probabilities. If there are ten possible semantic categories, processing logic performs each of the possible checks for the ten possible semantic categories on the column data. While in one embodiment, there one check for a semantic category, in alternate embodiments, there can be more than one check for the semantic category (e.g., different checks for names or addresses based on language or locality). This would result in ten different probabilities for the ten different possible semantic categories for that column. In this embodiment, processing logic can apply one or more of the following to the data in the column: whitelist/blacklist bloom filter, validator, lookup table, range, range/pattern, custom library function, and/or another type of data checker.

In one embodiment, processing logic applies a bloom filter to the cells of the column to determine a probability of a match for a semantic category. In this embodiment, the bloom filter is specific to a particular type of semantic category. For example, and in one embodiment, there can be a bloom filter for first names, last names, zip code, street address, city, county, or another type of data. The bloom filter can be populated with example content scraped from various data sources. For example, and in one embodiment, 160 k first names or 100 k last names scraped from the Internet to create a bloom filter for first name or last names, respectively. Processing logic can apply some or all of the bloom filters to the column data to determine a probability that the column data could be in this semantic category. For example, and in one embodiment, if there are bloom filters for first name, last name, and city, processing logic can apply each of these bloom filters to the column data to determine a probability that the column data is first name, last name, and/or city data. In one embodiment, processing logic determines a probability for a semantic category by determining the number of cells in the column that match a semantic category divided by the total number of cells that have data. In this embodiment, a column may be sparse, where not every cell in the column has data. Thus, processing logic would use the total number of cells in the column with data. For example, and in one embodiment, if a column of data had 100 cells, 50 with data, and 45 matched the semantic category of "name", the probability of a match for this semantic category would be 0.9.

In a further embodiment, there can be bloom filters for whitelists and/or blacklists of data. For example, and in one embodiment, a whitelist bloom filter can be populated content that possibilities for that semantic category (e.g., addresses bloom filter can have a whitelist with entries of "Washington" and "street") and a blacklist bloom filter that can be populated with content is not associated with that semantic category (e.g., a blacklist for a name bloom filter can have an entry of "street"). If there is a whitelist and blacklist bloom filter, then processing logic can determine a match for the bloom filter if the match is in the whitelist bloom filter and not the blacklist bloom filter or, alternatively, if the match is in both the whitelist bloom filter and the blacklist bloom filter. In one embodiment, there can be a blacklist and/or whitelist bloom filter for different semantic categories. In a further embodiment, a user can create their own bloom filters from an entire column or from values that are not identified.

Alternatively, processing logic can employ different checks to determine other types of semantic categories. In one embodiment, there are custom validators, which can be one or more rules of code, for semantic categories that can be checked by algorithmic rules. For example, and in one embodiment, a validator for Internet Protocol (IP) address can be one that checks the standard format rules for a 32-bit or 128-bit IP addresses. Similarly, there can be validators for other data types that follow strict formatting rules (e.g., (latitude, longitude), Uniform Resource Locator (URL), credit card numbers, email addresses, United States zip codes, and/or other data types with strict formatting rules). In another embodiment, processing logic can determine semantic categories using other types of checks, such as a lookup table, ranges, ranges/pattern, and other types. In one embodiment, a lookup table can be used for data with a relatively small spread (e.g., US states). In addition, ranges or range/patterns can be applied to determine semantic categories for other data types (e.g., data of birth, age, gender, and/or other types). In one embodiment, processing logic determines a probability for a semantic category by determining the number of cells in the column that match the semantic category divided by the total number of cells in the column that have a data value as described above.

At step 510, processing logic generates candidate semantic categories for the column. In one embodiment, processing logic gathers the candidate semantic categories computed from step 508 above. Processing logic generates a threshold at step 512. In one embodiment, a threshold for a column can be manually assigned. In another embodiment, the threshold for a column can be inferred using a machine learning model (e.g., a random forest machine learning model). The machine learning model is further described below. In this embodiment, processing logic uses a trained machine learning model to determine the column semantic category as described below.

At step 514, processing logic selects a column semantic category from the one or more candidate semantic categories using the threshold and the probabilities of the one or more candidate semantic categories. In one embodiment, processing logic selects the semantic category with the highest probability that is above the threshold. It is possible that processing logic does not select any semantic category for a particular column. In another embodiment, processing logic uses a machine learning model to determine the column semantic category. In this embodiment, processing logic creates a feature vector from the probabilities from the semantic categories check described above. Processing logic inputs this feature vector into the machine learning model, where the machine learning model outputs a label that is the column semantic category. In one embodiment, the trained machine learning model is a random forest machine learning model where the thresholds for selecting a column semantic category are encoded in the trained machine learning model.

In one embodiment, the trained machine learning model is trained using a training set of columnar training sets that include a variety of data with assigned semantic categories. In this embodiment, the machine learning model is iteratively trained using a machine learning algorithm (e.g., a random forest model) with the training sets. Each iteration, the weights in the machine learning model are adjusted such that the use of the machine learning model on the training sets gets closer and closer to the correct semantic category labels for each of the training sets. When the machine learning model determines the correct semantic categories for the input training set (to within a threshold), the machine learning model is trained.

The processing loop ends at step 516. Processing loop allows for user edits at step 518. In one embodiment, processing loop transmits the column semantic categories to a client, where the client presents the semantic categories for the data set (e.g., in a browser or other type of application). In this embodiment, a user can review the semantic categories for the different columns in the data set. A user may alter the assignments, where the client sends the semantic category alterations to the processing logic. Processing logic receives the semantic category alternations and finalizes the column assignments at step 520.

Figure 6:
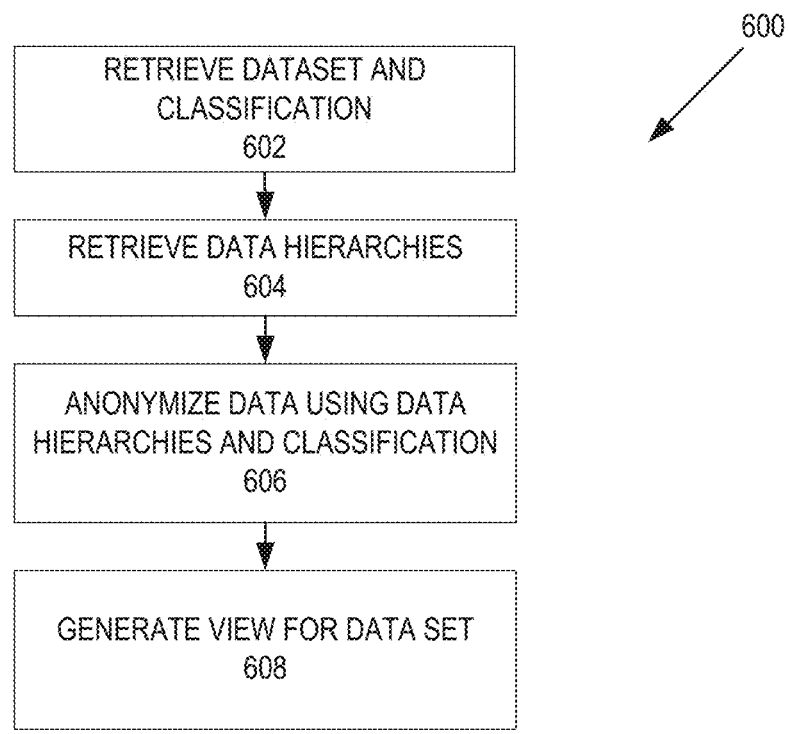
FIG. 6 is a flow diagram of one embodiment of a method to perform an anonymization operation of a data set.

As described above, one use of the semantic category assignments is to use these assignments for anonymizing the data in the data set. In one embodiment, a cloud computing platform can anonymize the data in the data set by creating an anonymized view of the data. In this embodiment, by creating the anonymized view, the underlying data is not transformed, so the data is preserved and can be used for a different anonymization or for other purposes. The anonymized view allows a user to use the data without revealing identifiable data. FIG. 6 is a flow diagram of one embodiment of a method 600 to perform an anonymization operation of a data set. In general, the method 600 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. For example, the processing logic may be implemented as the query processing 130. Method 600 may begin at step 602, where the processing logic retrieves the data set and the classification of the data set. In one embodiment, the classification includes the semantic category and privacy category assignments for each of the columns of data in the dataset.

Figure 9:
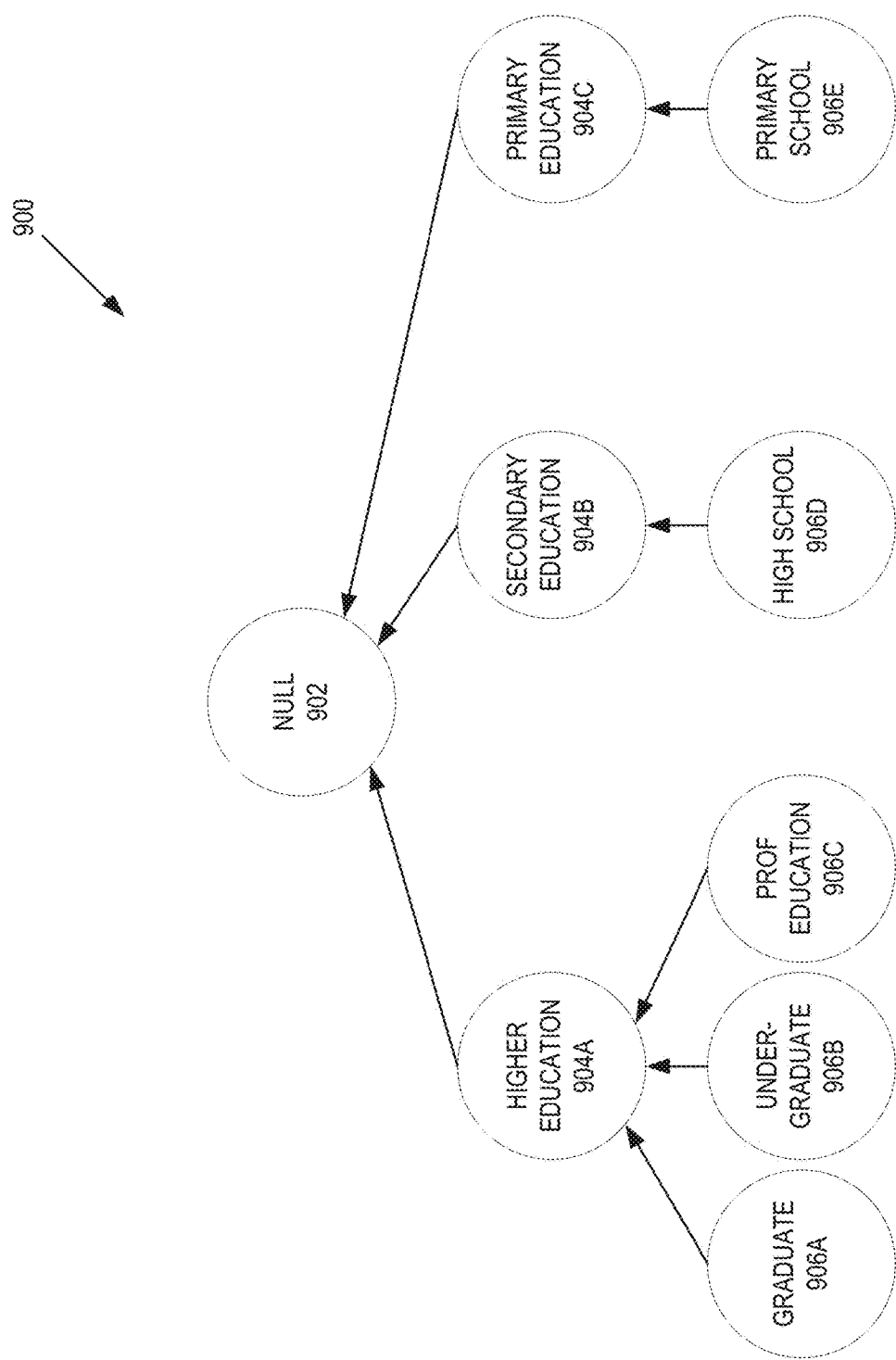
FIG. 9 is a schematic block diagram of one embodiment of an educational data hierarchy.

At step 604, processing logic retrieves the data hierarchies for the semantic categories that are identified with a privacy category of quasi-identifier. In one embodiment, a data hierarchy is a hierarchy that relates more specific data to less specific data. An example of a data hierarchy is shown in FIG. 9 below. Processing loop anonymizes the data in the data set using the data hierarchies and the classification. In one embodiment, processing loop suppresses the data for each column that has a privacy category of identifier. In this embodiment, each data that is an identifier can be used to uniquely identify an individual. Semantic categories with a privacy category of an identifier can be name (either first, last, full, and/or some variation on name), credit card, payment card, IP address, phone number, Social Security Number (or some other government identifying number), email address, passport number, vehicle identification number, International Mobile Equipment Identity, and/or another type of identifier.

In addition, processing logic suppresses the data for each column that has a privacy category of sensitive. In one embodiment, a semantic category of sensitive is for data that individuals do not ordinarily disclose in a general manner. This can be used for medically or financially sensitive data, such blood pressure, height, weight, salary, and/or other sensitive data. In one embodiment, suppressing data means that the data to be suppressed is not revealed in the anonymizing view for the data set.

In a further embodiment, processing logic anonymizes the data with a privacy category of quasi-identifier. Anonymization is the "process by which personal data is irreversibly altered in such a way that a data subject can no longer be identified directly or indirectly, either by the data controller alone or in collaboration with any other party". Risk based anonymization (or de-identification) is based on reducing the risk of re-identification while maximizing data utility. Re-identification is the process by which anonymized data is matched with its true owner. For example, a researcher was able to link an easily purchased voter registration list with "anonymized" hospital data. The hospital data had only removed the names of the patients but their date of birth, gender and zip code were still in the data. The researcher showed that these three attributes were enough to re-identify 87% of the US population.

One way to anonymize data is called k-Anonymity. k-Anonymity modifies direct-identifiers and indirect- or quasi-identifiers such that each individual record has at least k−1 other records in common with matching quasi-identifiers. The groups of records with matching quasi-identifiers are known as equivalence classes. Transformation of the data fully redacts direct identifiers while quasi-identifiers are generalized or suppressed to satisfy the k constraint while minimizing information loss. This is an NP-hard problem largely because the search space grows exponentially in the number of quasi-identifiers and the objectives are neither convex nor continuous. In one embodiment, processing logic anonymizes the data in the anonymizing view by applying a k-anonymity algorithm such that the quasi-identifiable data is generalized to satisfy the k constraint.

In one embodiment, processing logic can generalize quasi-identifier data by using a data hierarchy, applying a rule, mapping the data to a range or pattern, and/or other type of transformation. In this embodiment, applying a rule can be used for formatted data, such as deleting the rightmost digit(s) from a zip code or IP address. In addition, mapping the data to range can be done for an age data which maps a specific age to a range of ages. At step 608, processing logic generates an anonymized view for the data set using the anonymizing data determined above.

Figure 7:
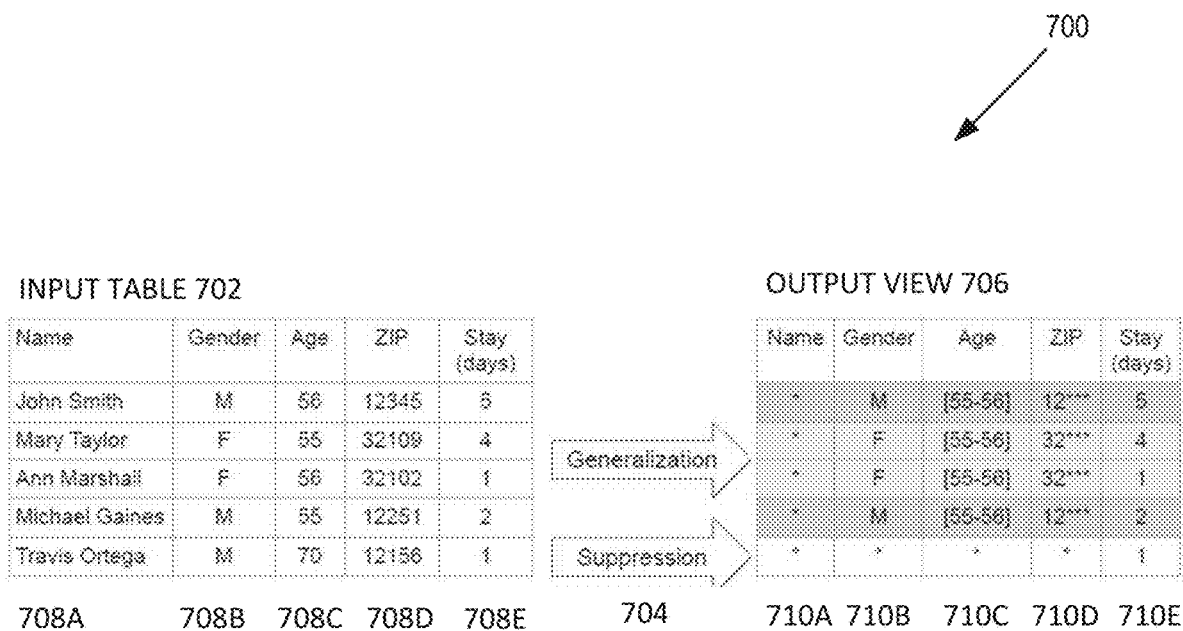
FIG. 7 is a schematic block diagram of one embodiment of anonymizing an input table.

FIG. 7 is a schematic block diagram of one embodiment of an anonymizing operation 700 on an input table. In FIG. 7, the input table 702 includes columns for name 708A, gender 708B, age 708C, zip code 708D, and stay 708E. In one embodiment, the classifier identifies the columns for name 708A as an identifier, columns age 708C and zip 708D as quasi-identifiable, and the columns gender 708B and stay 708E as other (e.g., not identifier, quasi-identifier, or sensitive). The anonymizing operation performs two different operations to anonymize the data: generalization and suppression (704). Generalization generalizes the data using a k-anonymity operation (or other anonymizing scheme) using a data hierarchy or another type of operation. Suppression prevents the data from being viewed. In FIG. 7, suppression is applied to the name column, resulting in no data being visible in name column 710A of output view 706. Column 710B-D (age and zip code) are generalized. For example, and in one embodiment, the age data is converted from a specific age to an age range in column 710C and the zip code data is generalized by removing the last three digits of the zip code. Because the gender and stay columns are classified as other, this data is generally not transformed.

In one embodiment, if a row includes data that cannot be generalized into a group, then that row is suppressed. For example, and in one embodiment, the row with the name of Travis Ortega has an age of 70 that is outside of the age range of 55-56 and there is only one person in or around age of 70. Because there is only one person in this age group, this row is suppressed in the output table 706 (except for the data in the stay column 710E).

Figure 8:
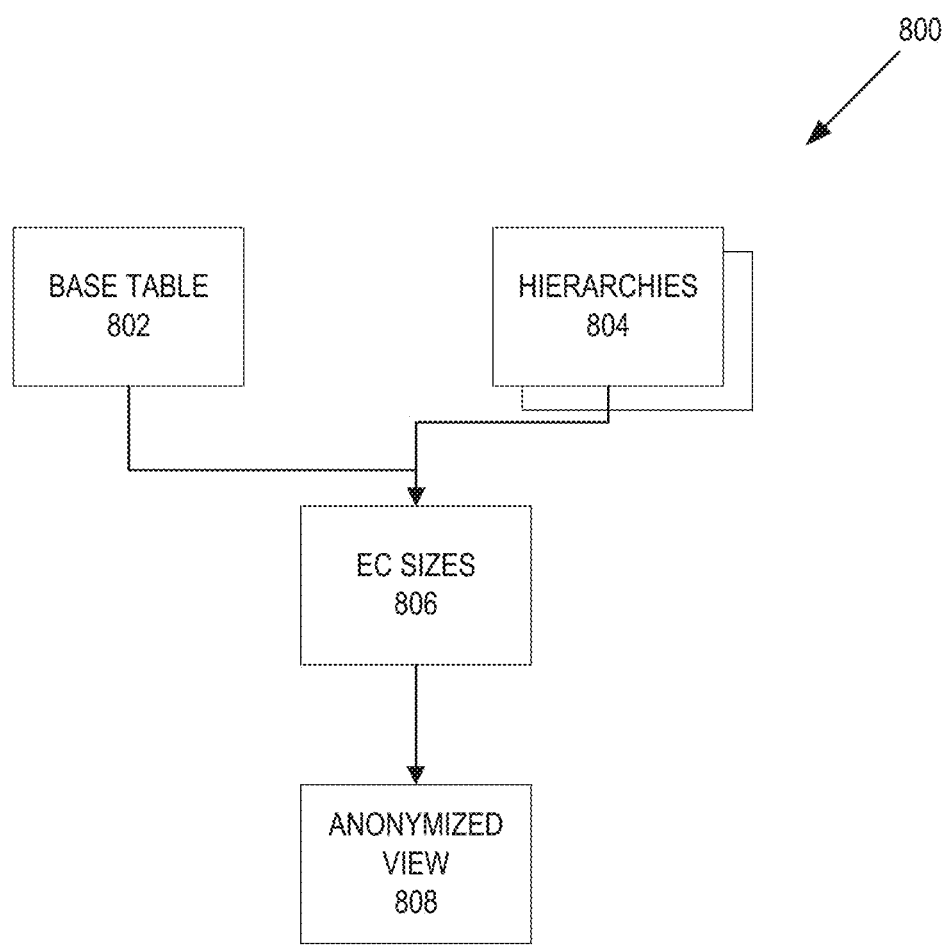
FIG. 8 is a schematic block diagram of one embodiment of creating an anonymizing view for an input table

FIG. 8 is a schematic block diagram of one embodiment of creating 800 an anonymizing view 808 for an input table. In FIG. 8, the base table 802 and data hierarchies 804 are fed into the Equivalent Class (EC) Sizes 806. In one embodiment, when a k-anonymous algorithm is applied to a data set, k is the minimum anonymous class size for the quasi-identifier data. If data is anonymized to smaller than the k class size, then the data is suppressed (as shown in FIG. 7 above). This will generate the anonymized view 806.

FIG. 9 is a schematic block diagram of one embodiment of an educational data hierarchy 900. In one embodiment, a data hierarchy is a hierarchy that relates more specific data to less specific data. In FIG. 9, the data hierarchy 900 is an educational data hierarchy that relates specific education levels to a more general education level. Data hierarchy 900 includes three levels in the hierarchy, starting with the root node 902 that has a value of NULL. The next level includes nodes 904A-C that represent a broad level of education groups, such as higher education 904A, secondary education 904B, and primary education 904C. Each of the nodes 904A-C is a child of the root node 902. In addition, each of the nodes 904A-C includes one or more children nodes that represent a more specific type of education. For example, and in one embodiment, the higher education node 904A has children nodes for graduate 906A, undergraduate 906B, and professional education 906C. In this example, graduate 906A, undergraduate 906B, and professional education 906C each represent a more specific type of higher education. Furthermore, the secondary node 904B has child node high school 906D, which represents a more specific type of secondary education. In addition, the primary education node 904C has a child node for primary school 906E, which represents a more specific type of primary education.

In one embodiment, the data hierarchy 900 can be used to anonymize the data that is related to educational level. For example, and in one embodiment, a column that includes college level education can be anonymized by replacing a specific college level education level to "higher education."

Figure 10:
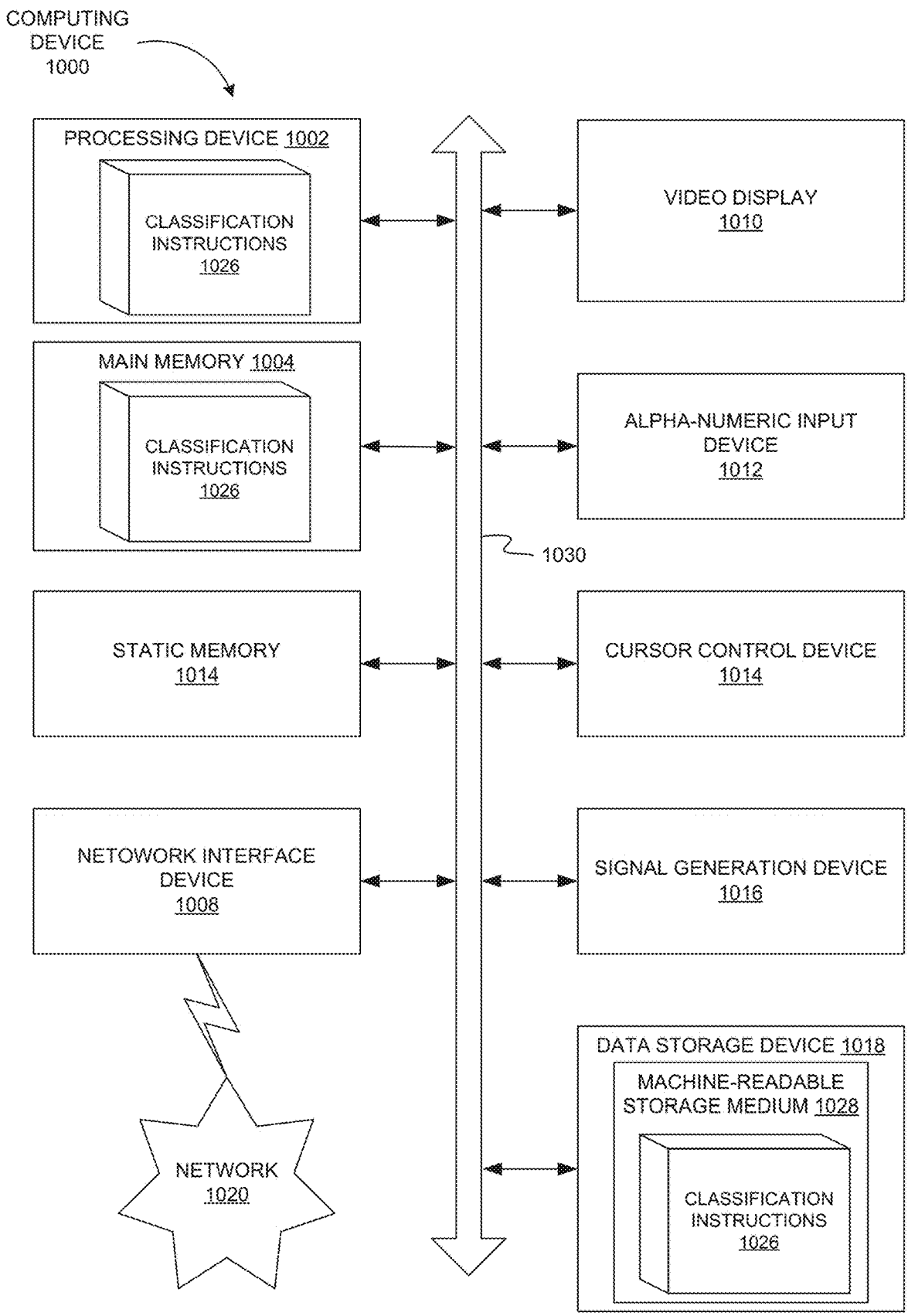
FIG. 10 is a block diagram of an example computing device that may perform one or more of the operations described herein, in accordance with some embodiments.

FIG. 10 is a block diagram of an example computing device 1000 that may perform one or more of the operations described herein, in accordance with some embodiments. Computing device 1000 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 1000 may include a processing device (e.g., a general purpose processor, a PLD, etc.) 1002, a main memory 1004 (e.g., synchronous dynamic random access memory (DRAM), read-only memory (ROM)), a static memory 1006 (e.g., flash memory and a data storage device 1010), which may communicate with each other via a bus 1030.

Processing device 1002 may be provided by one or more general-purpose processing devices such as a microprocessor, central processing unit, or the like. In an illustrative example, processing device 1002 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 1002 may also comprise one or more special-purpose processing devices such as an application specific integrated circuit (ASIC), a field programmable gate array (FPGA), a digital signal processor (DSP), network processor, or the like. The processing device 1002 may be configured to execute the operations described herein, in accordance with one or more aspects of the present disclosure, for performing the operations and steps discussed herein. In one embodiment, processing device 1002 represents cloud computing platform 110 of FIG. 1. In another embodiment, processing device 1002 represents a processing device of a client device (e.g., client devices 101-104).

Computing device 1000 may further include a network interface device 1008 which may communicate with a network 1020. The computing device 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse) and an acoustic signal generation device 1016 (e.g., a speaker). In one embodiment, video display unit 1010, alphanumeric input device 1012, and cursor control device 1014 may be combined into a single component or device (e.g., an LCD touch screen).

Data storage device 10010 may include a computer-readable storage medium 1028 on which may be stored one or more sets of instructions, e.g., instructions for carrying out the operations described herein, in accordance with one or more aspects of the present disclosure. Classification instructions 1026 may also reside, completely or at least partially, within main memory 1004 and/or within processing device 1002 during execution thereof by computing device 1000, main memory 1004 and processing device 1002 also constituting computer-readable media. The instructions may further be transmitted or received over a network 1020 via network interface device 1008.

While computer-readable storage medium 1028 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "retrieving," "generating," "selecting," "determining," "anonymizing," "computing," "applying," "adjusting," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned (including via virtualization) and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud). The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams or flow diagrams, and combinations of blocks in the block diagrams or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
   retrieving data from a data set, wherein the data is organized in a plurality of columns; and
   for each column in the plurality of columns:
   generating one or more candidate semantic categories for the column, wherein each of the one or more candidate semantic categories has a corresponding probability;

creating a feature vector for the column from the one or more candidate semantic categories and the corresponding probabilities;
inputting the feature vector into a trained machine learning model, wherein the trained machine learning model comprises an encoded threshold and identifies one of the one or more candidate semantic categories having a corresponding probability above the encoded threshold;
selecting a column semantic category for the column based on the candidate semantic category identified by the trained machine learning model;
determining a semantic category type of the column based on the column semantic category; and
anonymizing the data in the column in response to the semantic category type determined to be an identifier semantic type or a quasi-identifier type, wherein the anonymizing comprises:
retrieving a data hierarchy of the candidate semantic categories that comprises a lower level and a higher level, wherein the data hierarchy relates more specific data in the lower level with less specific data in the higher level;
matching the data from the column with a lower level location in the lower level of the data hierarchy;
identifying the less specific data in the higher level that relates to the lower level location; and
replacing the data in the column with the less specific data identified in the higher level.

2. The method of claim 1, wherein there are a plurality of candidate semantic categories for at least one column.

3. The method of claim 1, further comprising:
suppressing the data in the column in response to the semantic category type determined to be a sensitive semantic type.

4. The method of claim 1, wherein generation of one or more candidate semantic categories comprises:
generating the probability for each of the one or more candidate semantic categories.

5. The method of claim 4, wherein the generation of the probabilities comprises:
selecting a column from the plurality of columns;
applying a bloom filter with a potential semantic category to the data of the selected column; and
computing the probability based on a set of results from an application of the bloom filter to the data of the selected column.

6. The method of claim 5, wherein the bloom filter is one of a whitelist bloom filter and a blacklist bloom filter.

7. The method of claim 1, wherein the trained machine learning model is a random forest trained machine learning model.

8. A system comprising:
a set of storage resources;
a query processor to:
retrieve data from a data set, wherein the data is organized in a plurality of columns; and
for each column in the plurality of columns:
generate, with the query processor, one or more candidate semantic categories for the column, wherein each of the one or more candidate semantic categories has a corresponding probability;
create a feature vector for the column from the one or more candidate semantic categories and the corresponding probabilities;
input the feature vector into a trained machine learning model, wherein the trained machine learning model comprises an encoded threshold and identifies one of the one or more candidate semantic categories having a corresponding probability above the encoded threshold;
select a column semantic category for the column based on the candidate semantic category identified by the trained machine learning model;
determine a semantic category type of the column based on the column semantic category; and
anonymize the data in the column in response to the semantic category type determined to be an identifier semantic type or a quasi-identifier type, wherein the query processor to:
retrieve a data hierarchy of the candidate semantic categories that comprises a lower level and a higher level, wherein the data hierarchy relates more specific data in the lower level with less specific data in the higher level;
match the data from the column with a lower level location in the lower level of the data hierarchy;
identify the less specific data in the higher level that relates to the lower level location; and
replace the data in the column with the less specific data identified in the higher level.

9. The system of claim 8, wherein there are a plurality of candidate semantic categories for at least one column.

10. The system of claim 8, wherein the query processor further to:
suppress the data in the column in response to the semantic category type determined to be a sensitive semantic type.

11. The system of claim 8, wherein for the generation of one or more candidate semantic categories, the query processor further to:
generate the probability for each of the one or more candidate semantic categories.

12. The system of claim 11, wherein for the generation of the probabilities, the query processor further to:
select a column from the plurality of columns;
apply a bloom filter with a potential semantic category to the data of the selected column; and
compute the probability based on a set of results from an application of the bloom filter to the data of the selected column.

13. The system of claim 12, wherein the bloom filter is one of a whitelist bloom filter and a blacklist bloom filter.

14. The system of claim 8, wherein the trained machine learning model is a random forest trained machine learning model.

15. A non-transitory machine-readable medium storing instructions which, when executed by one or more processors of a computing device, cause the one or more processors to:
retrieve data from a data set, wherein the data is organized in a plurality of columns; and
for each column in the plurality of columns:
generate, with the one or more processor, one or more candidate semantic categories for the column, wherein each of the one or more candidate semantic categories has a corresponding probability,
create a feature vector for the column from the one or more candidate semantic categories and the corresponding probabilities;
input the feature vector into a trained machine learning model, wherein the trained machine learning model comprises an encoded threshold and identifies one of the one or more candidate semantic categories having a corresponding probability above the encoded threshold;
select a column semantic category for the column based on the candidate semantic category identified by the trained machine learning model;

determine a semantic category type of the column based on the column semantic category; and
anonymize the data in the column in response to the semantic category type determined to be an identifier semantic type or a quasi-identifier type, wherein the one or more processors to:
  retrieve a data hierarchy of the candidate semantic categories that comprises a lower level and a higher level, wherein the data hierarchy relates more specific data in the lower level with less specific data in the higher level;
  match the data from the column with a lower level location in the lower level of the data hierarchy;
  identify the less specific data in the higher level that relates to the lower level location; and
  replace the data in the column with the less specific data identified in the higher level.

* * * * *